3,325,276
METHOD OF IMPROVING ANTICAKING IN
AMMONIUM NITRATE FERTILIZERS
Harold L. Feller, Newark, Del., assignor to J. M. Huber Corporation, Locust, N.J., a corporation of New Jersey
No Drawing. Filed May 8, 1963, Ser. No. 278,982
3 Claims. (Cl. 71—64)

This invention relates to stable, non-caking fertilizers and explosives. More particularly, this invention relates to ammonium nitrate containing fertilizers and explosives, stabilized against caking by means of conditioners.

It is of primary importance to both the consumer and the manufacturere that a fertilizer or explosive does not have a tendency to cake during using, shipping or storage. Caking, particularly in the case of fertilizers, contributes to customer dissatisfaction and very often leads to the return of the product to the manufacturer. Lumpy or caked fertilizer is difficult to apply uniformly in the field and thus may impair the efficiency of the fertilizer in promoting crop growth.

The tendency of ammonium nitrate as well as other nitrogen containing fertilizers and explosives to cake is caused by varying ambient conditions of temperature, humidity, and pressure. When temperature and humidity rise, water is absorbed into crystals, dissolving them; when subsequently, the temperature and humidity is lowered, the dissolved material recrystallizes and coalesces or cakes with the existent granules or other recrystallized materials. When the fertilizer or explosive is stored over long time periods, usually in stacks of bags, this process is repeated and becomes more pronounced until the product in the bag becomes one cohesive mass. The pressure on the bags at the bottom of the stacks of stored bags intensifies the caking process.

Heretofore, it has been proposed to incorporate into the ammonium nitrate containing fertilizer or explosive, a conditioner designed to act as an agent to physically separate the particles and thus inhibit caking due to the action of temperature, pressure or humidity. Conditioners which have been employed include cocoanut shell meal, ground rice hulls, ground tobacco stems, resins, soaps, waxes, glycerine, urea, petrolatum, rosin, paraffin, kaolin, clay, diatomaceous earth, magnesium silicate, magnesium sulfate, soapstone, and the like. However, the treatment of ammonium nitrate containing materials with these agents has resulted in only partial protection against caking or settling. The disasters at Oppau, Germany, in 1921, and at Texas City, Tex., in 1947, are believed to have been caused by the detonation of ammonium nitrate which was coated with organic materials; as a result of this, today the most widely used conditioning agents are inorganic materials such as clay and diatomaceous earth. These inorganic conditioning agents, though satisfactory in many respects, are relatively expensive and must be used in relatively large amounts, usually from 3 to 5% based on the weight of the material coated. The conditioners have little or no value as fertilizer or explosive and are, therefore, undesirable ingredients. Because they become part of the bagged material, their shipment represents material increase in shipping cost.

Accordingly, it is an object of this invention to provide improved fertilizers.

It is a further object of this invention to provide improved explosives.

Another object of this invention is to provide free-flowing fertilizer and explosive compositions which exhibit little or no caking tendencies on storage.

It is also an object of this invention to provide fertilizers and explosives which are cake-resistant during storage and shipping.

A further object of this invention is to provide an ammonium nitrate containing fertilizer which may be readily distributed in the field.

We have discovered that commercially prepared explosive and fertilizer materials containing ammonium nitrate can have their normal tendency to cake during shipping and storage counteracted by utilizing as a conditioning agent, small amounts of the siliceous product which results from the acid leaching of kaolin clay. The finely divided siliceous product is recovered, unwashed, with the residual soluble salts of the leaching acid commingled with it. The conditioning can be accomplished by mixing the fertilizer or explosive with the conditioner prior to bagging and shipping. The novel conditioning agent successfully inhibits caking of hygroscopic fertilizers such as ammonium nitrate (including explosive grade), urea, ammonium sulfate, ammonium phosphate, sodium nitrate and potassium chloride, mixtures of these compounds or compositions containing one or more of the hygroscopic compounds.

The caking tendencies of other hygroscopic compounds and compositions can be inhibited by treatment with the novel conditioners of this invention. Among the compositions are sulfur, insecticides, common salt, accelerators used in rubber compounding, animal feeds and the like.

Without intending to be limiting, this invention can be adequately described with reference to ammonium nitrate-containing fertilizers which can be considered representative of the compositions which have caking tendencies.

Specifically, I have found that granular, or prilled ammonium nitrate as well as ammonium nitrate powder can be rendered substantially cake-resistant by mixing dry ammonium nitrate with a finely divided synthetic siliceous pigment commingled with a mineral acid salt prior to bagging the product for shipping and storage. The commingled siliceous pigment-mineral acid salt product is produced by leaching kaolin clay or other aluminum silicate mineral with a strong mineral acid such as sulfuric acid, nitric acid or hydrochloric acid. This produces a commingled intimate mixture of silica and the aluminum salt of the mineral acid. The amount of acid utilized for leaching is at least 75% of that required to combine with the aluminum of the clay. The resulting leach product is filtered and the filter cake is recovered and dried with the residual aluminum salt of the acid remaining intimately mixed with the filter cake. Generally, the resulting product contains from 35 to 45% $SiO_2$ and from 30–50% aluminum salt.

The exact amount of conditioning agent used will vary, depending upon the use to which the conditioned composition will be made, the conditions under which it will be stored, the amount of cake resistance desired and the presence of other materials. The best results are obtained when the amount of conditioner used is in the range of 0.5 to 3.25% by weight based on the weight of the fertilizer or explosive.

The following examples further illustrate this invention.

*Example 1*

400 pounds of kaolin clay (an air-floated soft clay mined and refined at Langley, S.C.) refined so as to have 55 to 60% of its particles smaller than 2 microns and only 20 to 25% of its particles coarser than 5 microns was dispersed thoroughly in 453 pounds of water containing 1.0 pound of tetrasodium pyrophosphate as a dispersing aid. The kaolin dispersion was charged into a pre-heated lead-lined pressure reaction vessel; 504 pounds of commercial 66° Baumé sulfuric acid containing 93.19% by weight $H_2SO_4$ was then added, this quantity of acid being 100% of the amount stoichiometric to the total metal oxide content of the clay and being such as to produce in the water an acid concentration of 49.1%. During the addition of the acid and throughout the reaction, the whole body of the dispersion was kept in vigorous agitation.

Upon completion of the addition of the acid, live steam was introduced into the reaction vessel until, several minutes after starting the steam flow, a violent exothermic action occurred which brought the material within 11 minutes from zero gauge pressure to a gauge pressure of 151 p.s.i. (temperature of 185.5° C.). In 18 minutes longer, the vessel had dropped to a gauge pressure of 120 p.s.i., corresponding to a temperature of 177° C. This pressure and temperature were maintained for a period of 4 hours by the regulated introduction of superheated steam. The reaction vessel was then vented to a pressure of 15–20 p.s.i. and the material was then dropped into a body of diluting water which cooled it to 93° C. It was then filtered to yield a filter cake containing 35% aluminum sulfate and the remainder silica. The filter cake thereafter was dried and disintegrated in a pulverizer.

*Example 2*

Various amounts of the conditioner as produced in Example 1 were added to 52 gram portions of dry ammonium nitrate and thoroughly mixed. The amounts added were respectively 0.5%, 1.0%, 1.5%, and 2% based on the weight of the ammonium nitrate.

*Example 3*

Various amounts of dry precipitated silica pigment, as produced in Example 1 but with the aluminum salt washed off, were added to 52 gram portions of dry ammonium nitrate and thoroughly mixed. The amounts added were respectively 0.5, 1.0 and 1.5 based on the weight of the ammonium nitrate.

Controls consisting of diatomaceous earth and kaolin clay conditioners as well as the conditioners of Examples 2 and 3 were tested for anti-caking properties in the following manner:

The ammonium nitrate for the tests was dried to constant weight at 105° C. The conditioning agent, in quantities as shown in Table I, was added to fifty-two grams of ammonium nitrate to yield approximately a one inch cake. The mixture was thoroughly mixed by shaking for four to five minutes. Water in quantities as shown in Table I was added drop-wise using a micro-burette followed by shaking and tumbling to distribute the water evenly. The material was then charged to a caking bomb provided with a 2″ cylindrical chamber and a pressure gauge and the pressure adjusted to twelve pounds gauge. The bombs were stored at 30° C. for seven days. Pressure adjustments were made to maintain the pressure at twelve pounds. After seven days storage, the bombs were opened, the cakes removed and dried at 55° C. for three days. After drying the cakes were lightly sanded to one inch and crushed on a Carver Hydraulic Press, hand operated and provided with 0–1000 and 0–24,000 p.s.i. gauges. The force required to crush the cake indicates the caking tendency of the charge.

The results of the test are in the following table.

TABLE I

| Type $NH_4NO_3$ | Conditioner | Percent Conditioner by Weight, Dry, $NH_4NO_3$ | Percent $H_2O$ | Crushing Strength, p.s.i. |
|---|---|---|---|---|
| Granular | None | | 1.0 | 3,650 |
| Do | do | | 0.5 | 2,450 |
| Do | do | | 0.25 | 1,850 |
| Do | Silica (Ex. 3) | 0.5 | 0.25 | 4,800 |
| Do | do | 1.0 | 0.25 | 1,400 |
| Do | do | 1.5 | 0.25 | 500 |
| Do | Silica (Ex. 1) | 0.5 | 0.25 | 3,600 |
| Do | do | 1.0 | 0.25 | 500 |
| Do | do | 1.5 | 0.25 | 10 |
| Prilled | None | | 1.0 | 700 |
| Do | Silica (Ex. 1) | 1.0 | 1.0 | 200 |
| Do | Diatomaceous Earth | 1.0 | 1.0 | 130 |
| Do | Silica (Ex. 1) | 2.0 | 1.0 | (¹) |
| Do | Diatomaceous Earth | 2.0 | 1.0 | 100 |
| Do | do | 3.0 | 1.0 | 60 |
| Do | None | | 0.5 | 170 |
| Do | Silica (Ex. 1) | 1.0 | 0.5 | 30 |
| Do | Diatomaceous Earth | 1.0 | 0.5 | 140 |
| Do | Silica (Ex. 1) | 2.0 | 0.5 | (²) |
| Do | Diatomaceous Earth | 2.0 | 0.5 | 30 |
| Do | do | 3.0 | 0.5 | 10 |
| Do | None | | 0.25 | 90 |
| Do | Silica (Ex. 1) | 0.5 | 0.25 | 130 |
| Do | Kaolin Clay | 0.5 | 0.20 | 70 |
| Do | Silica (Ex. 1) | 1.0 | 0.25 | 0 |
| Do | Kaolin Clay | 1.0 | 0.20 | 10 |
| Do | Silica (Ex. 1) | 1.5 | 0.25 | 0 |

¹ Fell apart on drying.
² No caking.

The data in the table illustrates that at various conditioner loadings at various amounts of moisture levels, silica-mineral acid salt conditioners of this invention are superior to known siliceous conditioners. The table indicates that at 0.5% conditioner loadings, the caking tendency is increased when compared to a control with no conditioner. This is a common phenomenon in conditioning wherein it is observed that very small amounts of conditioner sometimes have a tendency to increase caking. The lower limits of the amount of commingled silica-mineral acid salt to give effective conditioning is between 0.5% and 1% based upon the dry weight of the ammonium nitrate, preferable 0.7%. However, the amount necessary to effective condition other hygroscopic materials which exhibit caking tendencies varies with the material and the moisture present. In many cases, as little as 0.2% of the novel conditioning agent of this inveniton is effective. The upper limit of conditioner used is determined by the degree of anticaking desired and the amount of impurities which can be tolerated in a given system.

Having thus described the preferred embodiments of the invention for purposes of illustration, it should be understood that other modifications may be resorted to without departing from the scope of the invention as defined in the appended claims.

I claim:

1. A method for improving the storage stability and reducing the caking tendency of ammonium nitrate containing fertilizer and explosive compositions which consists essentially of the steps of (a) decomposing kaolin clay with aqueous sulfuric acid at an elevated temperature (b) filtering, drying and recovering unwashed, the siliceous decomposition product containing commingled therewith aluminum sulfate (c) intimately admixing from 0.7% to 3.25% by weight of said product with said ammonium nitrate composiitons.

2. A method for improving the storage stability and reducing the caking tendency of ammonium nitrate containing fertilizer and explosive compositions which consists essentially of the steps of (a) decomposing kaolin clay with sufficient ageous sulfuric acid at an elevated temperature to react with at least 75% of the aluminum of the kaolin (b) filtering, drying and recovering unwashed, the siliceous decomposition product containing commingled therewith aluminum sulfate (c) intimately admixing from 0.7% to 3.25% by weight of said product with said ammonium nitrate compositions.

3. A method of improving the storage stability and reducing the caking tendency of ammonium nitrate containing fertilizer and explosive compositions which consists essentially of the steps of (a) decomposing kaolin clay with sufficient aqueous sulfuric acid at an elevated temperature to react with at least 75% of the aluminum of the kaolin (b) filtering, drying and recovering unwashed, the siliceous decomposition product containing from 30% to 50% by weight of aluminum sulfate commingled therewith (c) intimately admixing from 0.7% to 3.25% by weight of said product with said ammonium nitrate compositions.

References Cited

UNITED STATES PATENTS

| | | | |
|---|---|---|---|
| 2,130,869 | 9/1938 | Block et al. | 252—385 |
| 2,399,987 | 5/1946 | Cordie et al. | 71—64 |
| 2,616,787 | 11/1952 | Whetstone | 71—64 |
| 2,660,541 | 11/1953 | Rickenbach | 71—64 |
| 2,770,600 | 11/1956 | Ricciardi | 252—385 |
| 2,794,701 | 6/1957 | Ames et al. | 23—103 |
| 2,974,054 | 3/1961 | Beamesderfer | 106—288 |
| 2,991,170 | 7/1961 | Szepesi et al. | 71—64 |
| 3,007,773 | 11/1961 | Marti | 23—103 |
| 3,137,565 | 6/1964 | Hayes | 71—64 |

DONALL H. SYLVESTER, *Primary Examiner.*

ANTHONY SCIAMANNA, *Examiner.*

G. W. RUTHERFORD, G. R. MYERS,
*Assistant Examiners.*